United States Patent
Leu (10) Patent No.: US 12,360,374 B2
(45) Date of Patent: Jul. 15, 2025

(54) ELECTRONIC DEVICE

(71) Applicant: Innolux Corporation, Miaoli County (TW)

(72) Inventor: Jian-Min Leu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 219 days.

(21) Appl. No.: 17/994,398

(22) Filed: Nov. 28, 2022

(65) Prior Publication Data

US 2023/0204962 A1  Jun. 29, 2023

(30) Foreign Application Priority Data

Dec. 23, 2021  (CN) .......................... 202111592945.3

(51) Int. Cl.
  *G02B 27/01* (2006.01)
  *G02B 27/28* (2006.01)

(52) U.S. Cl.
  CPC ....... *G02B 27/0172* (2013.01); *G02B 27/286* (2013.01); *G02B 2027/0118* (2013.01)

(58) Field of Classification Search
  CPC .......................... G02B 27/0172; G02B 27/286
  See application file for complete search history.

(56) References Cited

U.S. PATENT DOCUMENTS

2010/0238376 A1  9/2010  Sakai et al.
2023/0204962 A1*  6/2023  Leu .................... G02B 27/0172
                                                 385/33

FOREIGN PATENT DOCUMENTS

| CN | 103185988 | 7/2013 |
| CN | 104317104 | 1/2015 |
| CN | 105278151 | 1/2016 |
| CN | 105334672 | 2/2016 |
| TW | 200306437 | 11/2003 |

OTHER PUBLICATIONS

"Office Action of Taiwan Counterpart Application", issued on Mar. 24, 2023, p. 1-p. 5.

* cited by examiner

*Primary Examiner* — Rhonda S Peace
(74) *Attorney, Agent, or Firm* — JCIPRNET (57) ABSTRACT

An electronic device includes an optical element group and a light control element. The optical element group includes a first polarizing element, a second polarizing element, and a first compensation film. The first compensation film is disposed between the first polarizing element and the second polarizing element. The light control element is disposed corresponding to the optical element group. The second polarizing element is disposed between the first compensation film and the light control element.

19 Claims, 5 Drawing Sheets

ELECTRONIC DEVICE

CROSS-REFERENCE TO RELATED APPLICATION

This application claims the priority benefit of China application serial no. 202111592945.3, filed on Dec. 23, 2021. The entirety of the above-mentioned patent application is hereby incorporated by reference herein and made a part of this specification.

BACKGROUND

Technical Field

This disclosure relates to an electronic device.

Description of Related Art

Augmented Reality (AR) combines virtual images with real scenes through optical system. To improve the clarity of the virtual image, the ambient light intensity in the virtual image region must be reduced. If light at a large angle in the environment enters the optical system (such as a waveguide), it will produce overlapping images and destroy the display quality of the augmented reality. Therefore, it is necessary to reduce the light at a large angle to improve the display quality.

SUMMARY

The disclosure provides an electronic device, capable of reducing the transmittance of light at a large angle.

According to an embodiment of the disclosure, the electronic device includes an optical element group and a light control element. The optical element group includes a first polarizing element, a second polarizing element, and a first compensation film. The first compensation film is disposed between the first polarizing element and the second polarizing element. The light control element is disposed corresponding to the optical element group, where the second polarizing element is disposed between the first compensation film and the light control element.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same element symbols are used in the drawings and description to represent the same or similar parts.

Certain terms are used throughout this disclosure and in the claims to refer to specific elements. Those skilled in the art should understand that electronic device manufacturers may refer to the same elements by different names. This document does not intend to distinguish between elements that have the same function but different names. In the following description and claims, the terms "include" and "comprise" are open-ended terms and should therefore be interpreted to mean "includes but is not limited to . . . ".

The directional terms mentioned in this text, such as "up", "down", "front", "rear", "left", "right" are only references to the directions in the drawings. Therefore, the directional terms used are for illustrative purposes and are not intended to limit this disclosure. In the accompanying drawings, each of the drawings depicts typical features of methods, structures, and/or materials used in the particular exemplary embodiments. However, these drawings are not to be interpreted as defining or limiting the scope or nature of these embodiments. For example, for the sake of clarity, the relative size, thickness and location of each film layer, region or structure may be reduced or enlarged.

One structure (or layer, element, substrate) described in this disclosure is located on/above another structure (or layer, element, substrate), which may mean that the two structures are adjacent and directly connected, or may mean that the two structures are adjacent but not directly connected. Non-direct connection means that the two structures have at least one intermediate structure (or intermediate layer, intermediate element, intermediate substrate, intermediate spacer) between them, where the lower surface of one structure is adjacent to or directly connected to the upper surface of the intermediate structure and the upper surface of the other structure is adjacent to or directly connected to the lower surface of the intermediate structure. The intermediary structure can be a single or multi-layered solid or non-solid structure with no restrictions. In the disclosure, when a structure is disposed "on" other structures, it may mean that a structure is "directly" on other structures, or that a structure is "indirectly" on other structures, i.e., that there is at least one other structure interposed between a structure and other structures.

The term "about", "equal", or "same" mentioned herein typically represents a value is in a range within 20% of a given value, or a range within 10%, 5%, 3%, 2%, 1%, or 0.5% of a given value.

The use of sequential numbers such as "first", "second" and other words used to modify the elements in the specification and claims does not in itself imply and represent that the element (or elements) have any previous sequential numbers, nor does it represent the sequence of a element and another element, or the sequence of manufacturing methods. The use of multiple sequential numbers is only used to enable an element with a certain name and another element with the same name to make a clear distinction. The same words may not be used in the claim and the specification, whereby the first element in the specification may be the second element in the claim.

The electrical connection or coupling described in this disclosure may refer to direct connection or indirect connection. In the case of direct connection, the endpoints of elements on two circuits are directly connected or connected to each other by a conductor line, and in the case of indirect connection, the endpoints of the two circuit components have switches, diodes, capacitors, inductors, resistors, other suitable element, or a combination of the above components, but not limited thereto.

In the disclosure, the thickness, length, and width can be measured by optical microscopy, and the thickness or width can be measured by the profile image in the electron microscope, but not limited thereto. In addition, any two values or directions used for comparison may be subject to a certain degree of error. Moreover, the terms "equal," "equal to," "same," "substantially" or "approximately" referred to in the disclosure usually mean falling within 10% of a given value or range. Furthermore, the terms "the given range is the first value to the second value", "the given range falls within the range of the first value to the second value" means that the given range includes the first value, the second value and other values between them. If the first direction is perpendicular to the second direction, the angle between the first direction and the second direction can be between 80 degrees and 100 degrees; if the first direction is parallel to the second direction, the angle between the first direction and the second direction can be between 0 degrees and 10 degrees.

It should be noted that the embodiments set forth below may be substituted, recombined, or mixed to accomplish other embodiments without departing from the spirit of the disclosure. The features of each embodiment can be mixed and matched as long as they do not violate the spirit of the disclosure or conflict with each other.

Unless otherwise defined, all terms (including technical terms and scientific terms) used herein have the same meanings commonly understood by those with ordinary knowledge in the art. It is understood that the terms, such as those defined in commonly used dictionaries, should be interpreted as having meaning consistent with the context or background of the relevant technology and this disclosure, and should not be interpreted in an idealized or overly formal manner, unless specifically defined in the embodiment of the disclosure.

In the disclosure, the electronic device may include a display device, a backlight device, an antenna device, a sensing device, or a tiled device, but is not limited thereto. The electronic device may be a bendable or flexible electronic device. The display device may include a non-self-luminous display device or a self-luminous display device. The electronic device may, for example, include liquid crystal, light emitting diode, fluorescence, phosphor, quantum dot (QD), other suitable display media, or a combination of the foregoing. The antenna device may be a liquid crystal mode antenna or a non-liquid crystal mode antenna. The sensing device may include, for example but not limited to, a sensing device for sensing capacitance, light, thermal energy, or ultrasonic waves. In the disclosure, electronic elements may include passive elements and active elements, such as capacitors, resistors, inductors, diodes, transistors, and the like. The diodes may include light emitting diodes or photodiodes. The light emitting diode may include an organic light emitting diode (OLED), an inorganic LED, a mini LED, a micro LED, or a quantum dot LED. A tiled device may include, for example but not limited to, a tiled display device or a tiled antenna device. It should be noted that the electronic device may be arranged in any of the aforementioned combinations, but not limited thereto. In addition, the shape of the electronic device may be rectangular, circular, polygonal, with curved edges, or other suitable shapes. The electronic device may have a drive system, a control system, a light source system, . . . and other peripheral systems to support a display device, an antenna device, a wearable device (including, for example, augmented reality or virtual reality), an in-vehicle device (including, for example, a car windshield), or a tiled device.

This disclosure will be described below in terms of display devices as electronic devices or tiled devices, but the disclosure is not limited thereto.

FIG. 1 to FIG. 5 are schematic diagrams of electronic devices according to some embodiments of the disclosure, respectively. The technical solutions provided by the different embodiments in FIG. 1 to FIG. 5 may be interchanged, combined or mixed to constitute another embodiment without violating the spirit of the disclosure.

Figure 1:
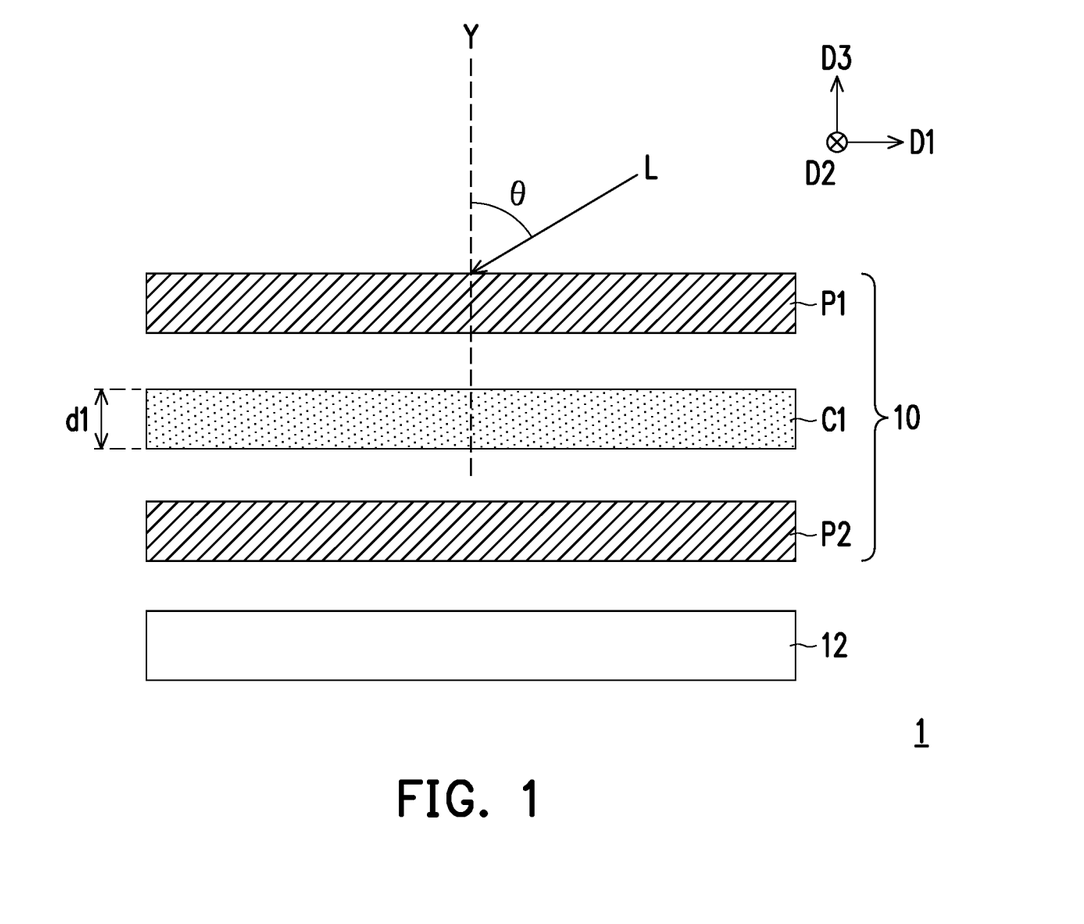
FIG. 1 to FIG. 5 are schematic diagrams of electronic devices according to some embodiments of the disclosure, respectively.

Referring to FIG. 1, an electronic device 1 may include an optical element group 10 and a light control element 12. The optical element group 10 may include a first polarizing element P1, a second polarizing element P2, and a first compensation film C1. The first compensation film C1 is disposed between the first polarizing element P1 and the second polarizing element P2. The light control element 12 is disposed corresponding to the optical element group 10. The second polarizing element P2 is disposed between the first compensation film C1 and the light control element 12.

In detail, the optical element group 10 may be used to filter an incident light L at a large angle, such as light with an incident angle θ greater than or equal to 50 degrees and less than 90 degrees, but not limited thereto. For example, the incident angle θ is an angle between an incident direction of the incident light L and the first polarizing element P1 (or the second polarizing element P2) in a thickness direction Y (e.g., a direction D3) of the electronic device 1. In some embodiments, as shown in FIG. 1, the optical element group 10 may include two polarizing elements (e.g., the first polarizing element P1 and the second polarizing element P2) and one compensation film (e.g., the first compensation film C1), but not limited thereto. In other embodiments, although not shown, the optical element group 10 may also include other film layers, such as one or more adhesive layers, more compensation films, or a combination of the above, but not limited thereto.

The second polarizing element P2 is disposed corresponding to the first polarizing element P1. As used herein, one element disposed corresponding to another element generally means that the two elements at least partially overlap. For example, the first polarizing element P1 and the second polarizing element P2 overlap at least partially in the thickness direction (e.g., the direction D3) of the electronic device 1.

The first polarizing element P1 and the second polarizing element P2 may have mutually parallel penetration axes. For example, the penetration axis of the first polarizing element P1 and the penetration axis of the second polarizing element P2 are parallel to a plane formed by a direction D1 and a direction D2, and an angle between the penetration axis of either of the first polarizing element P1 and the second polarizing element P2 and the direction D1 (or the direction D2) may be 0 degrees, 45 degrees, 90 degrees or 135 degrees, but not limited thereto.

The first compensation film C1 may be a C-type compensation film, but not limited thereto. A refractive index (N) of the C-type compensation film satisfies $Nx=Ny\neq Nz$. For example, $Nx$, $Ny$, and $Nz$ are the refractive indices in direction D1, direction D2, and direction D3, respectively. In some embodiments, $Nx$ is, for example, the refractive index measured along the direction D1, $Ny$ is, for example, the refractive index measured along the direction D2, and $Nz$ is, for example, the refractive index measured along the direction D3. In some embodiments, the direction D3 is the thickness direction of the compensation film, and the direction D1 and the direction D2 are perpendicular to the direction D3, and the direction D1 is perpendicular to the direction D2. The definitions of Nx, Ny, and Nz in the embodiments herein may be defined as above, and therefore are not repeated in the following. The first compensation film C1 may be a single-layer film or a multi-layer film. For example, the first compensation film C1 may be a single-layer C-type compensation film or a multi-layer C-type compensation film, but not limited thereto. The first compensation film C1 may have a phase retardation of the thickness (Rth), hereinafter referred to as a first phase retardation of thickness. Rth=(Nz−Nx)*d, where d is a thickness of the compensation film. The phase retardation of thickness may be measured using a phase retardation measurement system such as Rets.

Taking FIG. 1 as an example, when the first compensation film C1 is a single-layer C-type compensation film and the first compensation film C1 has a first thickness d1, the first phase retardation of thickness is equal to (Nz−Nx)*d1. On the other hand, when the first compensation film C1 is a multi-layer C-type compensation film, the first phase retardation of thickness is the sum of the Rth of each of the C-type compensation film. The first phase retardation of thickness may be modulated by material selection or thickness control to reduce the transmittance of light at a large angle (e.g., ambient light), and to reduce the probability that light at a large angle will pass through the optical element group 10 and be transmitted to the light control element 12.

Although not shown, the light control element 12 may include an upper substrate, a lower substrate disposed corresponding to the upper substrate, and a medium layer (e.g., a liquid crystal layer or a light emitting layer) disposed between the upper substrate and the lower substrate. In some embodiments, the light control element 12 may further include two conductive layers. The two conductive layers are electrically insulated from each other and may be respectively disposed between the upper substrate and the medium layer and between the lower substrate and the medium layer, or may be disposed together on one side of the medium layer (e.g., stacked between the lower substrate and the medium layer). In other embodiments, the upper substrate and the lower substrate are themselves electrically conductive, and the light control element 12 may not include the two conductive layers. Light control effect may be achieved by controlling the potential difference between the two conductive layers to adjust the state of the medium layer (e.g., a tilting direction of the liquid crystal).

Although not shown, the light control element 12 may also include multiple light control units. The light control units may be arranged in an array to enable independent light control of different regions of the light control element 12. In some embodiments, a display panel (e.g., a self-luminous display panel or a non-self-luminous display panel) or a liquid crystal panel may be used as the light control element 12, and one of the upper and lower polarizing elements (if any) of the display panel (or the liquid crystal panel) may be used as the second polarizing element P2, but not limited thereto.

In some embodiments, the electronic device 1 may be applied to augmented reality. The light control element 12 may be a transparent light control panel and may act as a light switch, which may be used to improve the clarity of the virtual image by controlling the transmittance of the light control element 12, for example by reducing the transmittance of the virtual image region. In other embodiments, the electronic device 1 may be applied to a display device with anti-peeping requirements. The light control element 12 may be a transparent display panel or an opaque display panel, the image screen may be provided through the light control element 12, and the optical element group 10 may be used to limit the viewing angle to achieve the anti-peeping effect.

Figure 2:
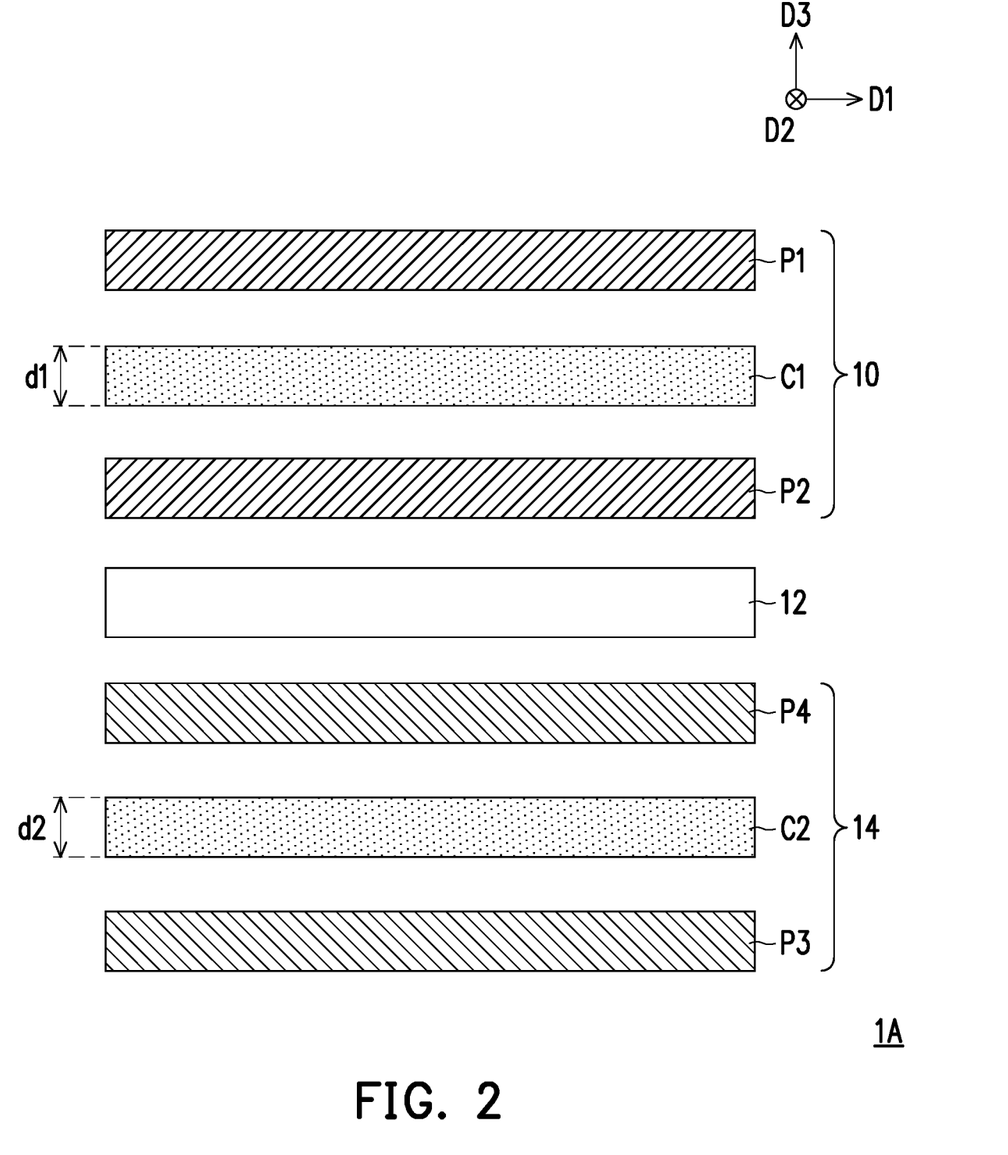

Referring to FIG. 2, the main differences between an electronic device 1A and the electronic device 1 of FIG. 1 are described as follows.

In the electronic device 1A, a light control element 12 is disposed between two optical element groups (e.g., an optical element group 10 and an optical element group 14), and the optical element group 14, the light control element 12, and the optical element group 10 are arranged, for example, in a direction D3.

In detail, the electronic device 1A further includes a third polarizing element P3, a second compensation film C2, and a fourth polarizing element P4. The second compensation film C2 is disposed between the second polarizing element P2 and the third polarizing element P3, and the light control element 12 and the first compensation film C1 are disposed corresponding to the second compensation film C2. For example, the light control element 12 may be disposed between the first compensation film C1 and the second compensation film C2. In addition, the fourth polarizing element P4 is disposed, for example, between the second compensation film C2 and the light control element 12. In some embodiments, a display panel (e.g., a self-luminous display panel or a non-self-luminous display panel) or a liquid crystal panel may be used as the light control element 12, and the upper and lower polarizing elements (if any) of the display panel (or the liquid crystal panel) may be used as the second polarizing element P2 and the fourth polarizing element P4, respectively, but not limited thereto.

In some embodiments, as shown in FIG. 2, the third polarizing element P3, the second compensation film C2, and the fourth polarizing element P4 constitute the optical element group 14, but not limited thereto. In other embodiments, although not shown, the optical element group 14 may also include other film layers, such as one or more adhesive layers, more compensation films, or a combination of the above, but not limited thereto.

The third polarizing element P3 and the fourth polarizing element P4 may have mutually parallel penetration axes. For example, the penetration axis of the third polarizing element P3 and the penetration axis of the fourth polarizing element P4 are parallel to a plane formed by the direction D1 and the direction D2, and an angle between the penetration axis of either of the third polarizing element P3 and the fourth polarizing element P4 and the direction D1 (or the direction D2) may be 0 degrees, 45 degrees, 90 degrees or 135 degrees, but not limited thereto. In addition, depending on the design requirements (e.g., liquid crystal type), the penetration axes of the polarizing elements located on opposite sides of the light control element 12 may be perpendicular or parallel to each other, i.e., the penetration axes of the third polarizing element P3 and the fourth polarizing element P4 may be parallel or perpendicular to the penetration axes of the first polarizing element P1 and the second polarizing element P2.

The second compensation film C2 may be a C-type compensation film, but not limited thereto. The second compensation film C2 may be a single-layer film or a multi-layer film. For example, the second compensation film C2 may be a single-layer C-type compensation film or a multi-layer C-type compensation film, but not limited thereto. The second compensation film C2 may have a phase retardation of thickness, hereinafter referred to as a second phase retardation of thickness. Taking FIG. 2 as an example, when the second compensation film C2 is a single-layer C-type compensation film and the second compensation film C2 has a second thickness d2, the second phase retardation of thickness is equal to (Nz−Nx)*d2. On the other hand, when the second compensation film C2 is a multi-layer C-type compensation film, the second phase retardation of thickness is the sum of the Rth of each of the C-type compensation film. The second phase retardation of thickness may be modulated by material selection or thickness control.

The second phase retardation of thickness may be different from the first phase retardation of thickness. For example, the first phase retardation of thickness may be greater or less than the second phase retardation of thickness to filter light at a large angle in different wavelength bands. In some embodiments, a difference between the first phase retardation of thickness and the second phase retardation of thickness (e.g., an absolute value of the first phase retardation of thickness minus the second phase retardation of thickness) may be greater than or equal to 125 nm and less than or equal to 375 nm, or greater than or equal to 150 nm and less than or equal to 350 nm, or greater than or equal to 175 nm and less than or equal to 325 nm, thereby reducing the transmittance of light at a large angle in a visible wavelength band (e.g., light with a wavelength of 400 nm to 700 nm). For example, the first phase retardation of thickness may be about 625 nm, and the second phase retardation of thickness may be about 875 nm, or the first phase retardation of thickness may be about 650 nm, and the second phase retardation of thickness may be about 850 nm, or the first phase retardation of thickness may be about 675 nm, and the second phase retardation of thickness may be about 825 nm, but not limited thereto.

The difference between the first phase retardation of thickness and the second phase retardation of thickness may be modulated by material selection or thickness control. In some embodiments, the first compensation film C1 and the second compensation film C2 may be formed of the same material and have different thicknesses. For example, the first thickness d1 may be 1 to 2 times the second thickness d2, or the second thickness d2 may be 1 to 2 times the first thickness d1, but not limited thereto. For example, the first thickness d1 and the second thickness d2 may be 55 μm and 77 μm, respectively, but not limited thereto. It should be noted that when the first compensation film C1 is a multi-layer film, the first thickness d1 refers to a total thickness of the multi-layer film constituting the first compensation film C1. When the second compensation film C2 is a multi-layer film, the second thickness d2 refers to a total thickness of the multi-layer film constituting the second compensation film C2. In other embodiments, the first compensation film C1 and the second compensation film C2 may be formed of different materials and have the same thickness. In still other embodiments, the first compensation film C1 and the second compensation film C2 may be formed of different materials and have different thicknesses.

In some embodiments, although not shown, the electronic device 1A may include more optical element groups, and the optical element groups may be disposed on the same side or opposite sides of the light control element 12. The adjacent optical element groups disposed on the same side of the light control element 12 may share the polarizing element, but not limited thereto.

Figure 3:
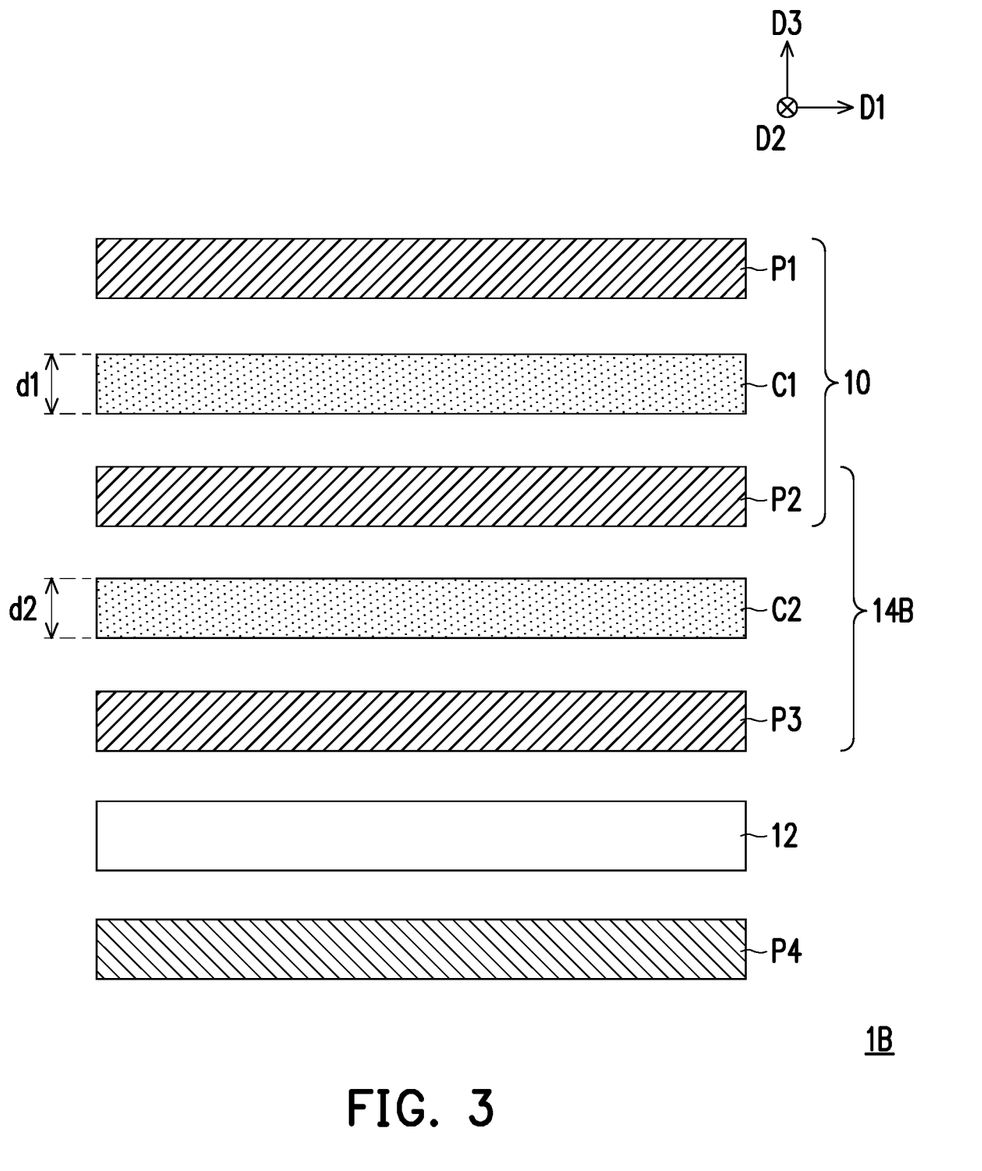

Referring to FIG. 3, the main differences between an electronic device 1B and the electronic device 1A of FIG. 2 are described as follows.

In the electronic device 1i, a light control element 12 is disposed between a third polarizing element P3 and a fourth polarizing element P4, and a second compensation film C2 and the third polarizing element P3 are disposed between a second polarizing element P2 and the light control element 12.

An optical element group 10 includes a first polarizing element P1, the second polarizing element P2, and the first compensation film C1, and an optical element group 14B includes the second polarizing element P2, the second compensation film C2, and the third polarizing element P3. The optical element group 10 and the optical element group 14B are disposed on the same side of the light control element 12, and the optical element group 10 and the optical element group 14B share a polarizing element (e.g., the second polarizing element P2).

Penetration axes of multiple polarizing elements located on the same side of the light control element 12 are parallel to each other, i.e., the penetration axes of the first polarizing element P1, the second polarizing element P2, and the third polarizing element P3 are parallel to each other. In addition, depending on the design requirements (e.g., liquid crystal type), the penetration axes of the polarizing elements located on opposite sides of the light control element 12 may be perpendicular or parallel to each other, i.e., the penetration axis of the fourth polarizing element P4 may be parallel or perpendicular to the penetration axes of the first polarizing element P1, the second polarizing element P2, and the third polarizing element P3.

Figure 4:
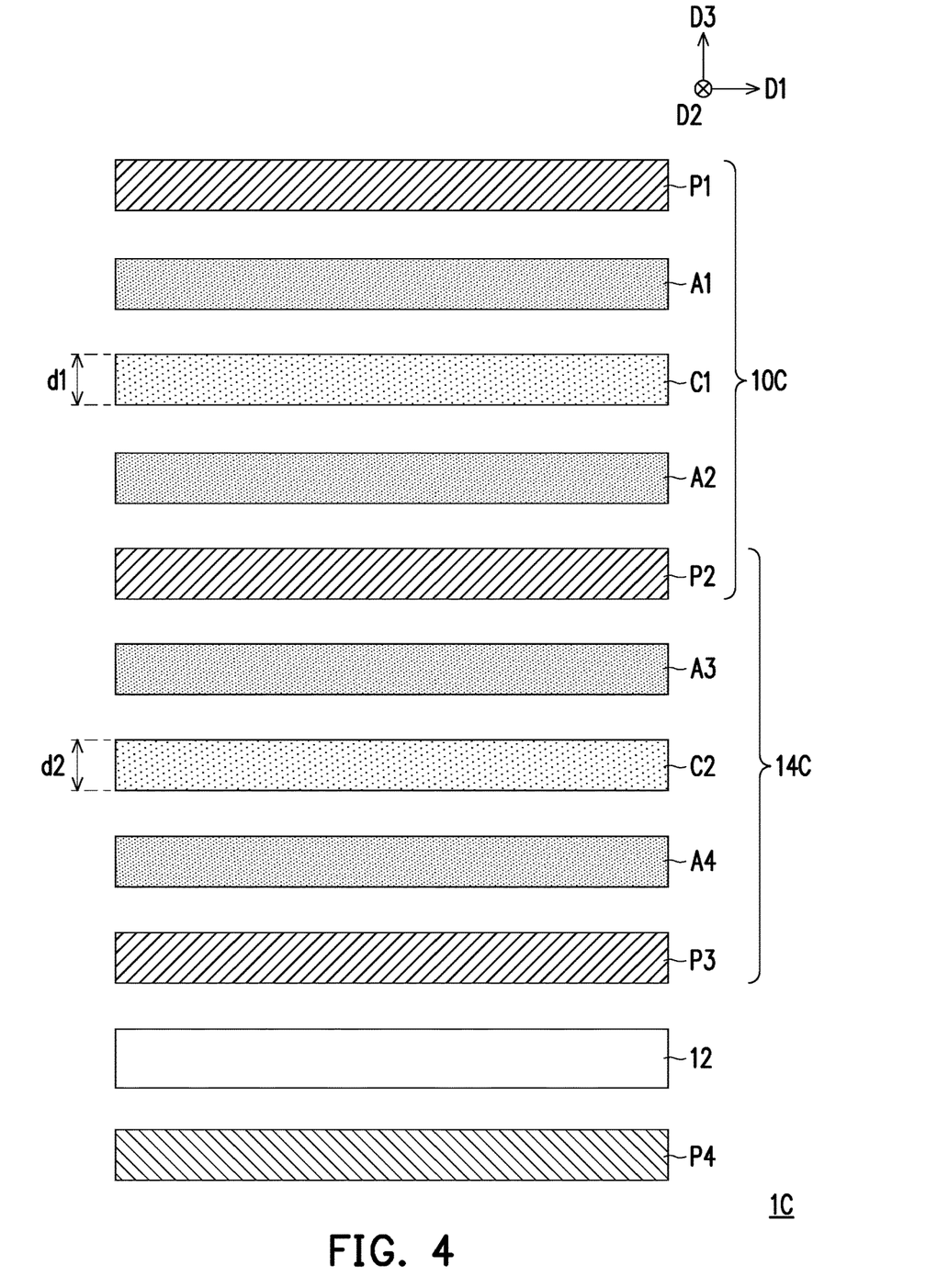

Referring to FIG. 4, the main differences between an electronic device 1C and the electronic device 1B of FIG. 3 are described as follows.

In the electronic device 1C, an optical element group 10C not only includes a first polarizing element P1, a second polarizing element P2, and a first compensation film C1, but also includes a first A-type compensation film A1 and s second A-type compensation film A2. The first A-type compensation film A1 is disposed between the first compensation film C1 and the first polarizing element P1, and the second A-type compensation film A2 is disposed between the first compensation film C1 and the second polarizing element P2. A refractive index (N) of the A-type compensation film satisfies Nx≠Ny. The A-type compensation film may have an in-plane retardation value (Ro), and Ro=(Nx−Ny)*d. The first A-type compensation film A1 and the second A-type compensation film A2 may be single-layer films or multi-layer films. The in-plane retardation value may be modulated by material selection or thickness control to further reduce the transmittance of light at a large angle. In some embodiments, the in-plane retardation value of each of the first A-type compensation film A1 and the second A-type compensation film A2 is 140±50 nm, but not limited thereto.

The first A-type compensation film A1 and the second A-type compensation film A2 may have mutually perpendicular optical axes, i.e., an angle between an optical axis of the first A-type compensation film A1 and an optical axis of the second A-type compensation film A2 is 90 degrees. For example, the optical axis of the first A-type compensation film A1 and the optical axis of the second A-type compensation film A2 are parallel to a plane formed by the direction D1 and the direction D2, and the angle between the optical axis of the first A-type compensation film A1 and the direction D1 (or the direction D2) may be 45 degrees, and the angle between the optical axis of the second A-type compensation film A2 and the direction D1 (or the direction D2) may be 135 degrees, but not limited thereto. In other embodiments, the angle between the optical axis of the first A-type compensation film A1 and the direction D1 (or the direction D2) may be 135 degrees, and the angle between the optical axis of the second A-type compensation film A2 and the direction D1 (or the direction D2) may be 45 degrees, but not limited thereto.

The electronic device 1C may further include a third A-type compensation film A3 and a fourth A-type compensation film A4. The third A-type compensation film A3 is disposed between the second polarizing element P2 and a second compensation film C2, and the fourth A-type compensation film A4 is disposed between the second compensation film C2 and a third polarizing element P3. The third A-type compensation film A3 and the fourth A-type compensation film A4 may be single-layer films or multi-layer films. The in-plane retardation value may be modulated by material selection or thickness control to further reduce the transmittance of light at a large angle.

The third A-type compensation film A3 and the fourth A-type compensation film A4 may have mutually perpendicular optical axes, i.e., an angle between an optical axis of the third A-type compensation film A3 and the fourth A-type compensation film A4 is 90 degrees. For example, the optical axis of the third A-type compensation film A3 and an optical axis of the fourth A-type compensation film A4 are parallel to a plane formed by the direction D1 and the direction D2. An angle between the optical axis of the third A-type compensation film A3 and the direction D1 (or the direction D2) may be 45 degrees, and an angle between the optical axis of the fourth A-type compensation film A4 and the direction D1 (or the direction D2) may be 135 degrees, but not limited thereto. In other embodiments, the angle between the optical axis of the third A-type compensation film A3 and the direction D1 (or the direction D2) may be 135 degrees, and the angle between the optical axis of the fourth A-type compensation film A4 and the direction D1 (or the direction D2) may be 45 degrees, but not limited thereto.

An optical element group 14C includes the second polarizing element P2, the second compensation film C2, the third polarizing element P3, the third A-type compensation film A3, and the fourth A-type compensation film A4. The optical element group 10C and the optical element group 14C are disposed on the same side of the light control element 12, and the optical element group 10C and the optical element group 14C share a polarizing element (e.g., the second polarizing element P2).

Figure 5:
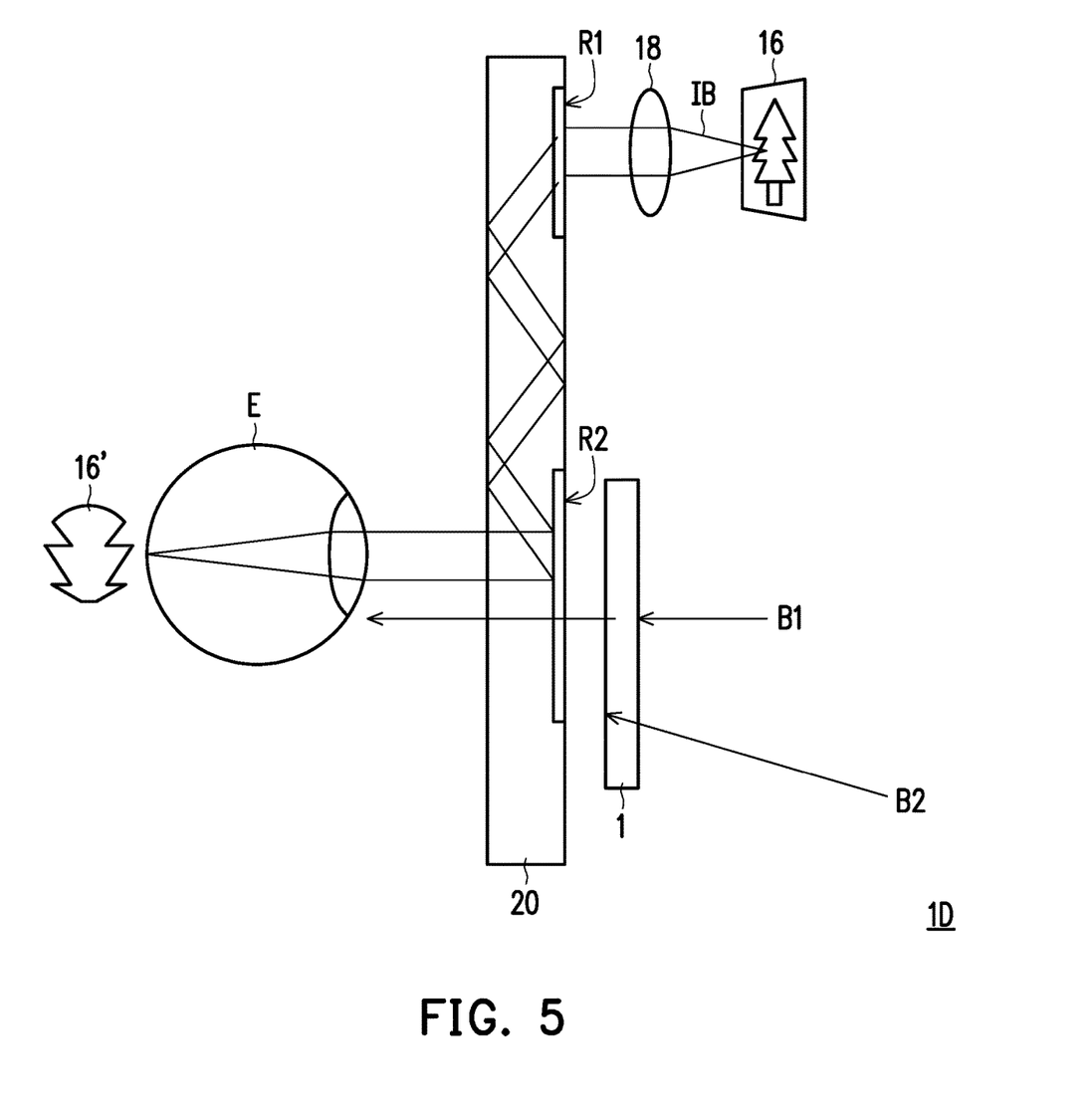

Referring to FIG. 5, the main differences between an electronic device 1D and the electronic device 1 of FIG. 1 are described as follows.

The electronic device 1D is, for example, applied to augmented reality and may include the electronic device 1 as shown in FIG. 1, a display 16, a lens group 18, and a waveguide 20. The electronic device 1, the display 16, and the lens group 18 are disposed on one side of the waveguide 20 away from an eye E of a user. The display 16 is disposed corresponding to a light incident region R1 of the waveguide 20, and the lens group 18 is disposed between the light incident region R1 of the waveguide 20 and the display 16. The electronic device 1 is disposed corresponding to a light emitting region R2 of the waveguide 20. The optical element group 10 (refer to FIG. 1) of the electronic device 1 may be disposed between the light control element 12 (refer to FIG. 1) and the light incident region R1 of the waveguide 20, or the light control element 12 may be disposed between the optical element group 10 and the light incident region R1 of the waveguide 20.

The display 16 is used to provide virtual images. For example, the display 16 may be a micro display, such as a micro LED display, a micro OLED display, or a liquid crystal on silicon (LCoS) display, but not limited thereto.

An image light IB from the display 16 may be converged by the lens group 18 to the light incident region R1 of the waveguide 20. The lens group 18 may include one or more lenses, without limitation herein.

The image light IB entering the waveguide 20 may be transmitted in the waveguide 20 in a total internal reflection (TIR) manner. For example, a material of the waveguide 20 may include glass, plastic, ceramic, quartz, sapphire, or a combination of the above materials, but not limited thereto.

The light incident region R1 of the waveguide 20 may have multiple light guide structures (not shown) that transmit the image light IB entering the waveguide 20 toward the light emitting region R2 of the waveguide 20. The light emitting region R2 of the waveguide 20 may have multiple light guide structures (not shown) that transmit the image light IB transmitted in the waveguide 20 toward the eye E of the user.

The electronic device 1 disposed corresponding to the light emitting region R2 of the waveguide 20 may allow light B1 (e.g., ambient light) incident perpendicularly to the electronic device 1 to pass through and filter light B2 incident at a large angle to the electronic device 1. Filtering the light B2 incident to the electronic device 1 at a large angle through the electronic device 1 helps to reduce the probability of the light B2 at a large angle entering the optical system (e.g., the waveguide 20), which further reduces the probability of generating overlapping images and helps to improve the display quality of the augmented reality (e.g., allowing the user to see a clear virtual image 16').

In other embodiments, the electronic device 1 may be replaced with the electronic device 1A shown in FIG. 2 to the electronic device 1C shown in FIG. 4. When the electronic device 1 is replaced with the electronic device 1A shown in FIG. 2, the first polarizing element P1 or the third polarizing element P3 in the electronic device 1A may be disposed adjacent to the waveguide 20. When the electronic device 1 is replaced with the electronic device 1B shown in FIG. 3 or the electronic device 1C shown in FIG. 4, the first polarizing element P1 or the fourth polarizing element P4 in the electronic device 1A may be disposed adjacent to the waveguide 20.

To sum up, in the embodiments of the disclosure, the transmittance of light with a large angle may be reduced by modulating the first phase retardation of thickness of the first compensation film, thereby improving the image quality. In some embodiments, the electronic device may include compensation films with different phase retardation of thickness to filter light at a large angle in different wavelength bands. In some embodiments, the electronic device may further include the A-type compensation film to further filter light at a large angle.

The above embodiments are used only to illustrate the technical solutions of the disclosure, but not to limit them; although the disclosure has been described in detail with reference to the foregoing embodiments, it should be understood by anyone having ordinary knowledge in the art that it is still possible to modify the technical solutions described in the foregoing embodiments or to replace some or all of the technical features thereof with equivalent ones, and that such modifications or replacements do not take the nature of the corresponding technical solutions out of the scope of the technical solutions of the foregoing embodiments of the disclosure.

Although the embodiments of the disclosure and the advantages thereof have been disclosed as above, it should be understood that anyone with ordinary knowledge in the field of the art can, without departing from the spirit and scope of this disclosure, make changes, substitutions and embellishments, and the features of each embodiment can be mixed and replaced with each other at will to form other new embodiments. In addition, the protection scope of the disclosure is not limited to the process, machine, manufacture, material composition, device, method and procedure in the specific embodiments described in the specification, and anyone with ordinary knowledge in the art can understand from this disclosure that the process, machine, manufacture, material composition, device, method and procedure currently or in the future developed can be used in accordance with this disclosure as long as they can perform substantially the same function or obtain substantially the same result in the embodiment described herein. Therefore, the protection scope of the disclosure includes the above-mentioned processes, machines, manufactures, material composition, devices, method and procedure. In addition, each claim constitutes an individual embodiment, and the protection scope of this disclosure includes the combination of each claim and embodiment. The protection scope of this disclosure shall be as defined in the scope of the following claims and their equivalents.

What is claimed is:

1. An electronic device comprising:
   an optical element group comprising:
      a first polarizing element;
      a second polarizing element; and
      a first compensation film disposed between the first polarizing element and the second polarizing element; and
      a third polarizing element; and
      a second compensation film disposed between the second polarizing element and the third polarizing element; and
   a light control element disposed corresponding to the optical element group, wherein the second polarizing element is disposed between the first compensation film and the light control element,
   wherein the light control element and the first compensation film are disposed corresponding to the second compensation film, and
   wherein the optical element group is disposed on a side of the light control element, and the electronic device only has two compensation films on the side of the light control element.

2. The electronic device according to claim 1, wherein the light control element is disposed between the first compensation film and the second compensation film.

3. The electronic device according to claim 1, wherein the first compensation film and the second compensation film are C-type compensation films.

4. The electronic device according to claim 1 further comprising:
   a fourth polarizing element, wherein the light control element is disposed between the third polarizing element and the fourth polarizing element.

5. The electronic device according to claim 1, wherein the first compensation film has a first phase retardation of thickness, the second compensation film has a second phase retardation of thickness, wherein a difference between the first phase retardation of thickness and the second phase retardation of thickness is greater than or equal to 125 nm and less than or equal to 375 nm.

6. The electronic device according to claim 1, wherein the first compensation film has a first thickness, the second compensation film has a second thickness, wherein the first thickness is 1 to 2 times the second thickness, or the second thickness is 1 to 2 times the first thickness.

7. The electronic device according to claim 1, wherein the first compensation film and the second compensation film are single-layer films or multi-layer films.

8. The electronic device according to claim 1, further comprising:
   a fourth polarizing element disposed between the second compensation film and the light control element.

9. The electronic device according to claim 1, wherein the optical element group further comprises:
   a first A-type compensation film disposed between the first compensation film and the first polarizing element; and
   a second A-type compensation film disposed between the first compensation film and the second polarizing element.

10. The electronic device according to claim 9 further comprising:
    a third polarizing element disposed corresponding to the optical element group and the light control element;
    a second compensation film disposed between the second polarizing element and the third polarizing element;
    a third A-type compensation film disposed between the second compensation film and the second polarizing element; and
    a fourth A-type compensation film disposed between the second compensation film and the third polarizing element.

11. The electronic device according to claim 10 further comprising:
    a fourth polarizing element disposed corresponding to the light control element, and the light control element is disposed between the third polarizing element and the fourth polarizing element.

12. The electronic device according to claim 1, wherein the first polarizing element and the second polarizing element have mutually parallel penetration axes.

13. The electronic device according to claim 1, wherein the light control element is a display panel.

14. The electronic device according to claim 1, wherein the light control element is a transparent light control panel comprising an upper substrate, a lower substrate disposed corresponding to the upper substrate, and a medium layer disposed between the upper substrate and the lower substrate.

15. The electronic device according to claim 14, wherein the medium layer is a liquid crystal layer or a light emitting layer.

16. The electronic device according to claim 14, wherein the upper substrate and the lower substrate are themselves electrically conductive.

17. The electronic device according to claim 14, wherein the light control element further comprises two conductive layers electrically insulated from each other, wherein the two conductive layers are respectively disposed between the upper substrate and the medium layer and between the lower substrate and the medium layer, or the two conductive layers are disposed together on one side of the medium layer.

18. The electronic device according to claim 1 further comprising:
    a waveguide having a light incident region and a light emitting region;
    a display disposed corresponding to the light incident region; and a lens group disposed corresponding to the light incident region and disposed between the waveguide and the display, wherein the optical element group and the light control element are disposed corresponding to the light emitting region.

19. The electronic device according to claim 18, wherein the optical element group, the light control element, the display, and the lens group are located on the same side of the waveguide.

* * * * *